US010323436B2

(12) United States Patent
White et al.

(10) Patent No.: US 10,323,436 B2
(45) Date of Patent: Jun. 18, 2019

(54) APPARATUS, METHOD AND SYSTEM FOR SECURING ITEMS TO A POST

(71) Applicant: ONESTEEL WIRE PTY LIMITED, Sydney, New South Wales (AU)

(72) Inventors: Mark White, Sydney (AU); Rodger Starkey, Sydney (AU)

(73) Assignee: Onesteel Wire Pty Limited, St Leonards, New South Wales (AU)

( * ) Notice: Subject to any disclaimer, the term of this patent is extended or adjusted under 35 U.S.C. 154(b) by 714 days.

(21) Appl. No.: 14/425,145

(22) PCT Filed: Aug. 28, 2013

(86) PCT No.: PCT/AU2013/000962
§ 371 (c)(1),
(2) Date: Mar. 2, 2015

(87) PCT Pub. No.: WO2014/032098
PCT Pub. Date: Mar. 6, 2014

(65) Prior Publication Data
US 2015/0225978 A1 Aug. 13, 2015

(30) Foreign Application Priority Data

Aug. 28, 2012 (AU) ................................ 2012903711
Jan. 30, 2013 (AU) ................................ 2013900293
Apr. 14, 2013 (AU) ................................ 2013205198

(51) Int. Cl.
*E04H 17/10* (2006.01)
*F16B 2/24* (2006.01)
(Continued)

(52) U.S. Cl.
CPC ............. *E04H 17/10* (2013.01); *A01K 3/005* (2013.01); *E04H 17/04* (2013.01); *E04H 17/12* (2013.01);
(Continued)

(58) Field of Classification Search
CPC ......... E04H 17/10; E04H 17/12; E04H 17/24; F16B 2/248; A01K 3/005
(Continued)

(56) References Cited

U.S. PATENT DOCUMENTS 483,858 A * 10/1892 McGarrell ............. A01G 17/06
24/533
611,105 A * 9/1898 Cowgill .................. E04H 17/10
256/48
(Continued)

FOREIGN PATENT DOCUMENTS

AU 1998085209 4/1999
FR 2465852 3/1981
(Continued)

OTHER PUBLICATIONS

International Search Report for PCT/AU2013/000962 dated Sep. 24, 2013 (5 pages).
(Continued)

*Primary Examiner* — Matthieu F Setliff
(74) *Attorney, Agent, or Firm* — Michael Best & Friedrich LLP

(57) ABSTRACT

An apparatus comprising an elongate element having a retaining portion, and two projecting portions. In one form, hooked ends of each projecting portion are configured to extend through, and interact with, apertures in a flange of the post. In another form, the projecting portions are of different lengths, such that the position of the retaining portion is variable with respect to a given pair of apertures.

17 Claims, 6 Drawing Sheets

(51) Int. Cl.
*A01K 3/00* (2006.01)
*E04H 17/04* (2006.01)
*E04H 17/12* (2006.01)
*F16L 3/123* (2006.01)
*F16L 3/127* (2006.01)
*F16L 3/137* (2006.01)
*F16L 3/24* (2006.01)

(52) U.S. Cl.
CPC .............. *F16B 2/248* (2013.01); *F16L 3/127* (2013.01); *F16L 3/1236* (2013.01); *F16L 3/137* (2013.01); *F16L 3/24* (2013.01); *Y10T 29/49863* (2015.01)

(58) Field of Classification Search
USPC .................................. 256/47, 48, 57, DIG. 3
See application file for complete search history.

(56) References Cited

U.S. PATENT DOCUMENTS

| | | | | |
|---|---|---|---|---|
| 817,017 | A | * | 4/1906 | Stransky ................. E04H 17/10 256/50 |
| 1,186,062 | A | * | 6/1916 | Anglemyer ............. E04H 17/10 256/48 |
| 1,826,182 | A | * | 10/1931 | Lee .......................... E04H 17/10 256/57 |
| 1,848,452 | A | * | 3/1932 | Young ..................... E04H 17/10 256/57 |
| 2,452,630 | A | * | 11/1948 | Burritt .................... E04H 17/10 256/48 |
| 2,631,804 | A | | 3/1953 | Uhlhorn |
| 4,619,440 | A | | 10/1986 | Thevenin et al. |
| 4,893,788 | A | | 1/1990 | Chave |
| 2005/0061924 | A1 | | 3/2005 | Boyle |

FOREIGN PATENT DOCUMENTS

| | | | | |
|---|---|---|---|---|
| GB | 441918 | A | * 1/1936 | .............. F16B 2/248 |
| GB | 1114701 | A | * 5/1968 | ........... A47F 5/0823 |
| GB | 2034783 | | 6/1980 | |

OTHER PUBLICATIONS

Australian Examination Report for Application No. 2016253690 dated Aug. 2, 2017 (5 pages).

* cited by examiner

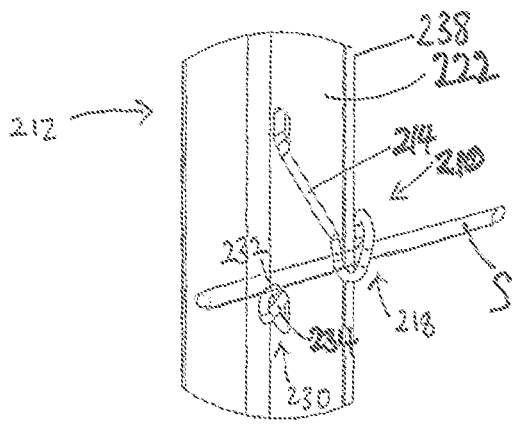
FIGURE 1
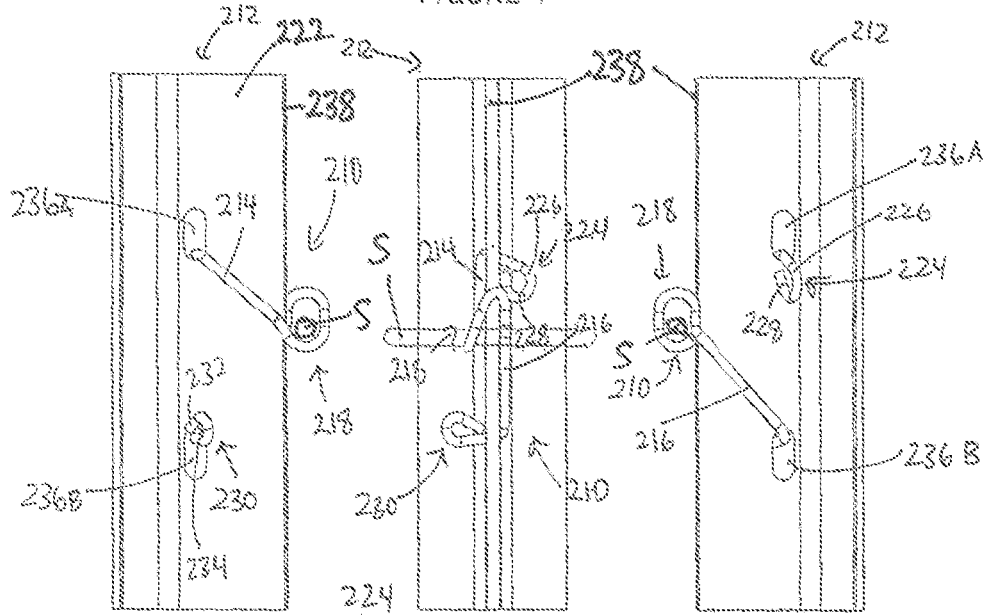
FIGURE 2A    FIGURE 2B1    FIGURE 2C
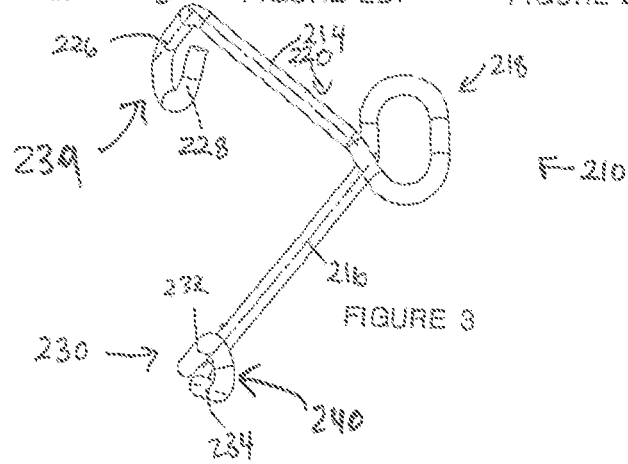
FIGURE 3

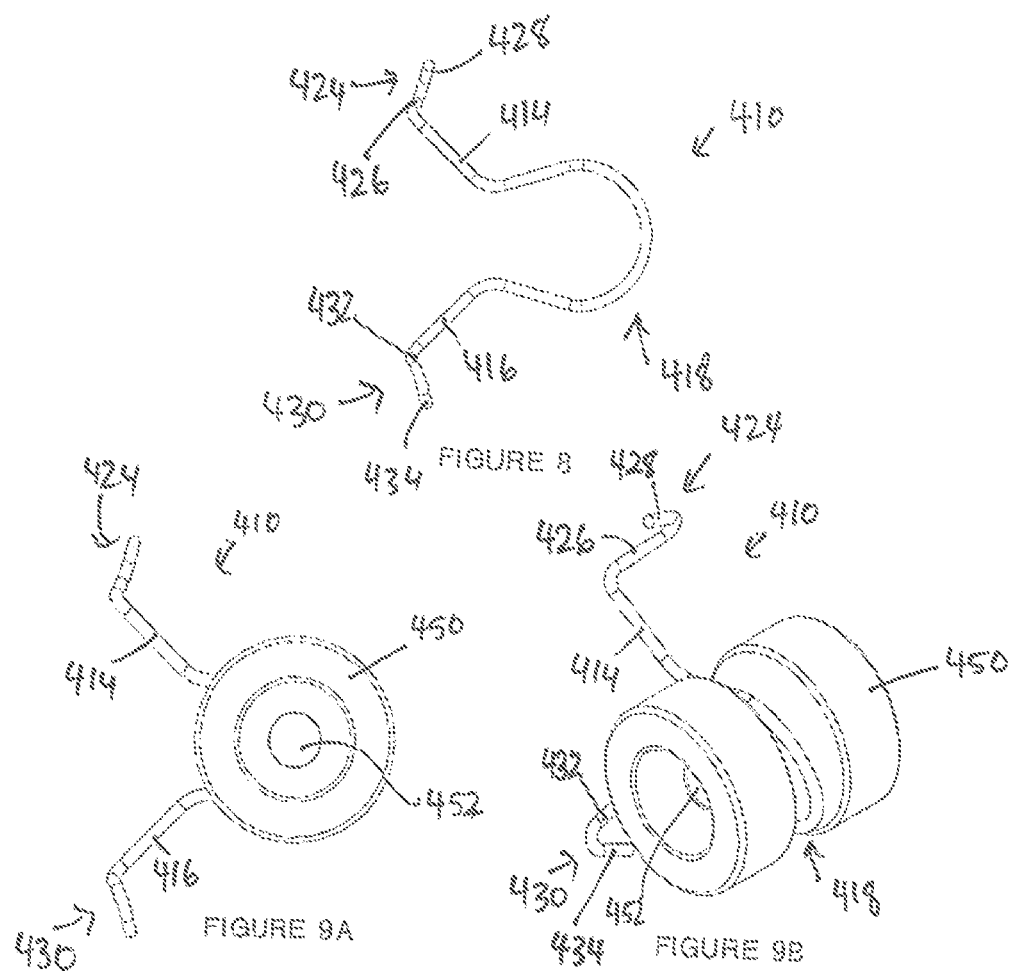
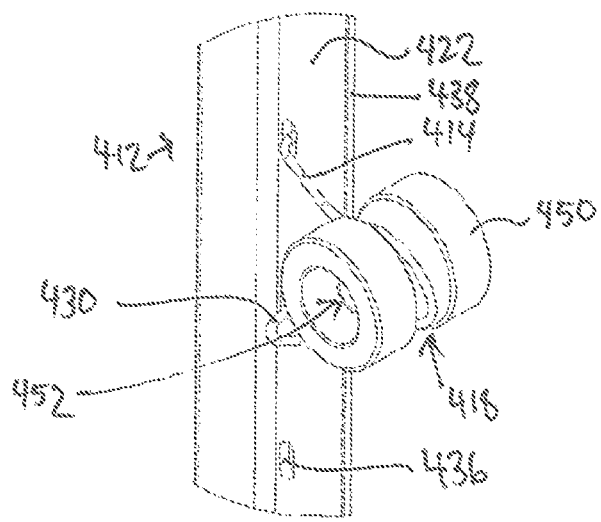
FIGURE 10

APPARATUS, METHOD AND SYSTEM FOR SECURING ITEMS TO A POST

TECHNICAL FIELD

An apparatus, method and system are disclosed for securing items to a post. The apparatus, method and system find particular application in fencing to secure strands, such as wire strands, to a fence post, though they can be employed in applications such as demarcation, signage, retention, barricades etc. The term "strand" as employed herein is to be broadly interpreted to include various elongate components that can be secured to a post. The term "post" as employed herein is to be broadly interpreted to include upright posts, rails, cross-members, struts, stays, channels, etc.

BACKGROUND ART

Posts for use in applications such as fencing, demarcation, signage etc are known. Such posts are usually formed from steel, though in some applications it is known to mould posts from a plastic material (e.g. for use in electric fencing).

Steel fence posts have been known for many years that are roll-formed to have a Y-shaped or T-shaped profile (i.e. in end view). The post may take the form of a picket and in this case may be provided (e.g. cut) with a pointed end to facilitate post driving into the earth.

Such steel fence posts are usually provided with a series of spaced holes in a flange thereof (i.e. in the so-called "stalk" or "stem" of the post) to enable strands of fencing wire to be secured to the post, usually by tying each wire strand to the post with a separate short length of wire tie threaded through an individual hole, or by employing a wire "clip". However, the wire can also be directly threaded through such holes. These holes are typically punched into an already roll-formed post in a separate step.

In addition (or as an alternative) to the series of holes, the posts can be provided with a series of spaced passages that are usually machined to project right into the stalk from a distal edge thereof. These passages enable a strand of fencing wire to be moved into and retained in the passage, thereby securing the wire directly to the post. Again, these passages are typically machined into an already roll-formed post in a separate step.

The existing systems for attaching wire to a fence post can require a high degree of manual labour, and some of the ties employed also require special tools and the services of a skilled fencer. For posts provided with spaced passages, usually an additional, complex and costly retention system is factory-fitted to the post in a separate process. This retention system is employed to maintain the wires secured in the post.

There are a number of existing systems that employ an elongate clip to secure a wire to a post. In some systems, such as those disclosed in U.S. Pat. Nos. 1,826,182, 2,452,630 and 4,619,440, each end of the elongate clip hooks into a different aperture, that may be in the same or a different flange of the post. For example, U.S. Pat. No. 2,452,630, discloses a wire clip for use with a circular post. The clip is designed so that the two ends of the elongate clip co-operate with two spaced openings in a flange, that is formed off the circular post. The wire is threaded through a coiled hole intermediate the two openings and secured by the wire clip.

Yet a further clip that is formed from an elongate element is disclosed in US 2005/0061924. A number, of the clips require a two-piece clip arrangement, whereby there is a looped portion for a strand to be threaded through, and a clipping portion for securing the looped portion to the post. The clipping portion is shown in the form of a U-shaped clip that extends through a circular hole of the post. Another clip is also shown in US 2005/0061924 that does not require the clipping portion to attach to a post. This second clip has two legs extending from a looped portion. One, or each, of the legs extend through the same hole to attach the clip to the post.

The above references to the background art do not constitute an admission that the art forms a part of the common general knowledge of a person of ordinary skill in the art. The above references are also not intended to limit the application of the apparatus, method and system disclosed herein.

SUMMARY OF THE DISCLOSURE

In a first aspect there is disclosed apparatus for securing at least one strand to a post. The apparatus finds particular application in fencing to secure wire strands to a fence post, though can be employed in other applications. The post may be of the type that comprises at least one elongate flange having at least two apertures therethrough. The flange may project out from, for example, a central longitudinal axis of the post. The post may have up to three (or more) elongate flanges that each project from the central longitudinal axis of the post, and may take the form of a Y- or T-post. The flange with the at least two apertures therethrough may comprise a stalk or stem of the Y- or T-post (although other flanges of the post may be employed). The stalk is generally the major (or larger) of the flanges in a Y- or T-post. Further, the post may also take the form of a picket.

The apparatus comprises an elongate element. The element is adapted to form a strand retaining portion. The element is also adapted to form first and second projecting portions that extend from the strand retaining portion. A recess is defined, between the first and second projecting portions, and configured to receive the post elongate flange therein. An end of the first projecting portion is adapted to comprise a hook with two leg portions that extend through, and interact with an edge of, a first aperture in the post. An end of the second projecting portion is adapted to comprise a hook with two leg portions that extend through, and interact with an edge of, a second aperture in the post. This secures the apparatus, and a strand retained in the strand retaining portion of the apparatus, to the post.

Such an arrangement provides securement of the apparatus, and thus the strand, to the post. The two leg portions of each hook, once inserted to extend through the aperture, prevent the respective projecting portion ends from becoming accidentally dislodged from the aperture. The two leg portions are thus located adjacent to the aperture and/or flange, on an opposite side of the flange to the remainder of the respective projecting portion.

Contrary to both U.S. Pat. No. 2,452,630 and US 2005/0061924, an apparatus, such as that disclosed in the first aspect, has both ends of its elongate element adapted to be secured to the post. Specifically, the two leg portions forming the hook on the projecting portion ends increases the securement of the apparatus to the post, with respect to U.S. Pat. No. 2,452,630 and US 2005/0061924.

In one embodiment, the two leg portions of one or both hooks may be distanced such that their maximum dimension is approximately equal to that of the post aperture. In this regard, the two leg portions may require compaction to allow their insertion through the aperture. This may improve the securement of the apparatus to the post by preventing accidental removal therefrom.

In one form, the two leg portions of one or both hooks may be substantially parallel, forming a U-shaped hook. In this form, the two leg portions of one or both hooks may be biased apart. The biasing can further assist with increasing the securement of the apparatus to the post. Biasing apart of the two leg portions can assist in preventing accidental dislodgement of the apparatus from the post, by providing a natural compulsion to keep the two leg portions in position (i.e. spaced at a distance greater than the length/height of the aperture).

In another form, the two leg portions of one or both hooks may be curved to form a loop. The dimension of the loop may be such that it is bulbous, and wider than the width of the aperture.

In one form, at least one of the projecting portion ends may be adapted to be offset from a longitudinal axis of the flange, when mounted perpendicular to the post. In this regard, it may be necessary to rotate the apparatus to align an axis of one projecting portion end with the longitudinal axis of the aperture to enable the projecting portion end to be inserted thereinto. Once the projecting portion end has been inserted into the aperture, the apparatus can be rotated into its in-use position and the second projection portion end inserted into another aperture (i.e. such that the apparatus is secured to the post so that the strand retaining portion can be used to retain an elongate strand).

In one form, the projecting portion ends may be adapted in different manners, to facilitate securement of the apparatus to the post.

In one form, the first projecting portion may be shorter than the second projecting portion. In this regard, the strand retaining portion will be positioned closer to the first aperture (i.e. the aperture through which the hook of the first projecting portion end extends and interacts with an edge of) than the second aperture (i.e. the aperture through which the hook of the second projecting portion end extends and interacts with an edge of), when mounted to the post. This allows the spacing between vertically adjacent strands to be altered along the length of the post, simply by alternating the way in which the apparatus is secured to the post.

In a second aspect there is disclosed apparatus for securing at least one strand to a post. The apparatus finds particular application in fencing to secure wire strands to a fence post, though can be employed in other applications. The post may be of the type that comprises at least one elongate flange having at least two apertures therethrough. The flange may project out from, for example, a central longitudinal axis of the post. The post may have up to three (or more) elongate flanges that each project from the central longitudinal axis of the post, and may take the form of a Y- or T-post. The flange with the at least two apertures therethrough may comprise a stalk or stem of the Y- or T-post (although other flanges of the post may be employed). The stalk is generally the major (or larger) of the flanges in a Y- or T-post. Further, the post may also take the form of a picket.

The apparatus comprises an elongate element. The element is adapted to form a strand retaining portion. The element is further adapted to form first and second projecting portions that extend from the strand retaining portion. A recess is defined, between the first and second projecting portions, and configured to receive the post elongate flange therein. An end of the first projecting portion is adapted to extend through, and interact with an edge of, a first aperture. An end of the second projecting portion is adapted to extend through, and interact with an edge of, a second aperture, so as to secure the apparatus to the post.

In accordance with the second aspect, the first projecting portion is shorter than the second projecting portion. In this regard, the strand retaining portion will be positioned closer to the first aperture than the second aperture, when mounted to the post. Alternatively, the apparatus can be mounted to the post such that the strand retaining portion is positioned closer to the second aperture than the first aperture (i.e. by mounting the apparatus to the post such that the end of the first projecting portion extends through, and interacts with an edge of, the second aperture and the end of the second projecting portion extends through, and interacts with an edge of, the first aperture), thus enabling a strand two possible positions with respect to a given aperture pair. This allows the spacing to be altered along the length of the post, simply by alternating or inverting the way in which the apparatus is secured to the post. This is contrary to U.S. Pat. No. 1,826,182 or 2,452,630, in which only one such position for a given aperture pair is defined.

The projecting portion ends of the apparatus defined in the second aspect may be otherwise adapted as defined in the first aspect.

In various forms of the first and second aspects, the first and second projecting portions may be biased apart. Having the projecting portions biased in this manner can provide an additional force to urge the ends to interact with the respective apertures. This can further increase the vertical forces keeping the apparatus attached to the post, which results in enhanced securement thereto.

In one form, the ends of the projecting portions may be further adapted to engage a side of the elongate flange opposite to the side on which the portion projects. This assists in anchoring the apparatus to the post, to provide additional securement thereto.

In various forms of the preceding aspects, the strand retaining portion may be adapted to space the strand from a distal edge of the post elongate flange. This may be useful when using, for example, electrified wire. In this form, the apparatus may preferentially be formed from, or coated with, an insulating material. Additionally, or alternatively, the strand retaining portion may further comprise an insulating component, which may be used to space the strand from the distal edge of the post elongate flange and/or the elongate element, when the flange and/or elongate element are formed from a non-insulating material. Such a component may be a separate component which can be inserted into, or attached to, the strand retaining portion to isolate the electrified wire from the post and/or the wire. Further, the strand may be able to be secured to this insulating component, which is then attached or secured to the strand retaining portion.

In one form, the strand retaining portion may be adapted to receive two or more strands. In this regard, the strand retaining portion may be adapted so that the two or more strands are retained in separate partitions of the strand retaining portion, or the strands may be positioned in the same part of the strand retaining portion.

In one form, the elongate element may be a wire or rod formed from high carbon steel, such as spring steel. The element may optionally have a non-ferrous metallic coating, such as a galvanised coating. The element may additionally, or alternatively, comprise a pigmented coating for further corrosion protection or for aesthetics. The pigmented coating may be an Organic pigmentation or dye.

In a third aspect there is disclosed a method for securing at least one strand to a post. The post may be of the type that comprises at least one elongate flange having at least two apertures therethrough. The post may also take the form of a picket. The method may find particular application in fencing to secure wire strands to a fence post, though can be employed in other applications. The method comprises:

(I) positioning a hooked end of a first projecting portion, the hooked end comprising two leg portions, of an elongate element such that it extends through a first aperture of the post and interacts with an edge thereof;

(II) positioning the at least one strand at a strand retaining portion of the elongate element; and (III) positioning a hooked end of a second projecting portion, the hooked end comprising two leg portions, of the elongate element such that it extends through a second aperture of the post and interacts with an edge thereof. The first and second projecting portions are positioned such that they straddle the elongate flange. The elongate element thus engages and secures the at least one strand to the post.

In a fourth aspect there is disclosed a method for securing at least one strand to a post. The post may be of the type that comprises at least one elongate flange having at least two apertures therethrough. The post may also take the form of a picket. The method may find particular application in fencing to secure wire strands to a fence post, though can be employed in other applications. The method comprises:

(I) positioning an end of a first projecting portion of an elongate element such that it extends through a first aperture of the post and interacts with an edge thereof;

(II) positioning the at least one strand at a strand retaining portion of the elongate element; and (III) positioning an end of the second projecting portion, which is longer than the first projecting portion, of the elongate element such that it extends through a second aperture of the post and interacts with an edge thereof. The first and second projecting portions are positioned such that they straddle the elongate flange. The elongate element thus engages and secures the at least one strand to the post. In this fourth aspect, the strand is secured to the post at a position that is closer to the first aperture than the second aperture.

In the method of the third and fourth aspects, steps (I) and (II) may be reversed. Alternatively, steps (I) and (II) may occur simultaneously. In a further alternative, step (II) may occur before steps (I) or (III). Similarly, positioning of the strand in step (II) may occur after step (III). Alternatively, step (III) may be performed before step (I) and/or step (II). In the method, steps (I), (II) and (III) may occur simultaneously. These different possibilities may arise from different specific configurations of the apparatus employed.

The method of the third and fourth aspects can employ the apparatus as defined in the first or second aspect.

In various forms of the method of the third and fourth aspects, the second projecting portion end may be positioned to extend through an aperture which is adjacent to the aperture through which the first projecting portion end was, or will be positioned to extend. Alternatively, the second projecting portion end may be positioned to extend through an aperture that is spaced from the first aperture (i.e. there may be apertures between the first and second apertures which are unused, or retain another elongate element).

When the post comprises three or more apertures, the method of the third and fourth aspects can be repeated with a second elongate element. Similarly, the method can be repeated with additional elongate elements, as required for the specific (e.g. fencing) purpose.

In the method defined in the third and fourth aspects, when two elongate elements (i.e. two apparatus) are secured to a post, the elements can be secured to the post using a common aperture (i.e. three apertures can be used to secure two elements to the post, rather than each element requiring two separate apertures). In this regard, the first projecting portion end of the first apparatus can be inserted through a first aperture. The second projecting portion end of the first apparatus can be inserted through a second aperture. The first projecting portion end of the second apparatus can be inserted through the second aperture, whilst the second projecting portion end of the second apparatus can be inserted through a third aperture. In such an example, either or both of the apparatus may be secured in an inverted orientation (e.g. the second projecting portion end of the second apparatus may be inserted through the second aperture, and the first projecting portion end of the second apparatus may be inserted through the third aperture).

When the first and second projecting portions are of differing length, this allows alteration of the spacing between adjacent strand retaining portions. For example, the first projecting portion end of a first apparatus can be inserted through a first aperture, with the second projecting portion end of the first apparatus being inserted through a second aperture. The first projecting portion end of a second apparatus can be inserted through a third aperture, whilst the second projecting portion end of the second apparatus can be inserted through the second aperture (i.e. the second apparatus has been inverted, with respect to the first apparatus, when mounted to the post). This can increase the spacing between the strand retaining portions of the first and second apparatus.

In the method defined in the third and fourth aspects, the method may further comprise positioning an insulating component at the strand retaining portion such that the strand is separated from a distal edge of the post elongate flange. This may be achieved by first positioning the strand at the insulating component and then positioning the insulating component at the strand retaining portion, or vice versa. This may also be achieved either before or after the elongate element has been positioned at the post.

A device may be used in the method of the third and fourth aspects to position the elongate element and/or strand in any of steps (I), (II) or (III). However, steps (I) and (II) may be performed manually, while step (III) may be performed using the device, or step (III) and (II) may be performed manually, while step (I) may be performed using the device.

In a fifth aspect there is disclosed a system for securing at least one strand to a post. The system comprises a post and at least one apparatus for securing the at least one strand to the post. The post may be of the type that comprises an elongate flange having at least two apertures therethrough. The post may also take the form of a picket.

The apparatus comprises an elongate element. The element is adapted to form a strand retaining portion. The element is further adapted to form first and second projecting portions that extend from the strand retaining portion. A recess is defined, between the first and second projecting portions, that is configured to receive the post elongate flange therein. An end of the first projecting portion is adapted to comprise a hook with two leg portions that extend through, and interact with an edge of a first aperture. An end of the second projecting portion is adapted to comprise a hook with two leg portions that extend through, and interact with an edge of, a second aperture. When both projecting portion ends are inserted into the respective apertures, the apparatus, and thus the at least one strand, is secured to the post.

The elongate element may otherwise be adapted in the manner defined in the first aspect.

In a sixth aspect there is disclosed a system for securing at least one strand to a post. The system comprises a post and at least one apparatus for securing the at least one strand to the post. The post may be of the type that comprises an elongate flange having at least two apertures therethrough. The post may also take the form of a picket.

The apparatus comprises an elongate element. The element is adapted to form a a strand retaining portion. The element is further adapted to form first and second projecting portions that extend from the strand retaining portion. A recess is defined, between the first and second projecting portions, that is configured to receive the post elongate flange therein. An end of the first projecting portion is adapted to extend through, and interact with an edge of, a first aperture. An end of the second projecting portion is adapted to extend through, and interact with an edge of, a second aperture. When both projecting portion ends are inserted into the respective apertures, the apparatus, and thus the at least one strand, is secured to the post. In this sixth aspect, the first projecting portion is shorter than the second projecting portion. In this regard, the strand retaining portion will be positioned closer to the first aperture than the second aperture, when mounted to the post. This allows the spacing to be altered along the length of the post, simply by alternating the way in which the apparatus is secured to the post.

The elongate element may otherwise be adapted in the manner defined in the second aspect.

In one form of the system defined in the fifth and sixth aspects, the first aperture, through which the first projecting portion end extends, may be adjacent to the second aperture, through which the second projecting portion end extends. When the post comprises more than two apertures, and a plurality of apparatus are used, a first apparatus and a second apparatus can be mounted to the post using a common aperture. In this regard, the first projecting portion end of the first apparatus can be inserted through a first aperture. The second projecting portion end of the first apparatus can be inserted through a second aperture. The first projecting portion end of the second apparatus can be inserted through the second aperture, whilst the second projecting portion end of the second apparatus can be inserted through a third aperture.

When the first and second projection portions are of differing length, this allows alteration of the spacing between adjacent strand retaining portions. For example, the first projecting portion end of a first apparatus can be inserted through a first aperture, with the second projecting portion end of the first apparatus being inserted through a second aperture. The first projecting portion end of a second apparatus can be inserted through a third aperture, whilst the second projecting portion end of the second apparatus can be inserted through the second aperture (i.e. the second apparatus has been inverted, with respect to the first apparatus, when mounted to the post). This can increase the spacing between the strand retaining portions of the first and second apparatus. Conversely, if the first projecting portion ends of both apparatus are inserted through the second aperture, this will decrease the spacing between the strand retaining portions.

The system defined in the fifth and sixth aspects may comprise a plurality of apparatus for securing a plurality of strands to the post. Additionally, or alternatively, a single apparatus may be employed to secure two or more strands to the post. Further, the system may comprise a plurality of posts. The system may also comprise an insulating component. The insulating component may be adapted to be positioned at the strand retaining portion to space the strand from the distal edge of the post elongate flange.

The post in the system defined in the fifth and sixth aspects may comprise apertures of the same or differing configurations. For example, the apertures may be shaped as traditional circular holes, or they may be formed as elongate, rectangular, obround, triangular, or other shaped slots. The use of such an apparatus with an elongate slot, such as an obround slot, may be preferred as the elongate nature of the slot will allow the respective adapted ends of each projecting portion to be more easily inserted into the slot, especially with respect to a comparative post utilising traditional circular holes.

The system may further comprise a device for attaching at least one end of the apparatus elongate element to the post.

In a seventh aspect, there is disclosed a system for securing at least one strand to a post. The system comprises a post and at least one apparatus for securing the at least one strand to the post. The post may be of the type that comprises an elongate flange having at least two apertures therethrough. The post may also take the form of a picket.

The apparatus comprises an elongate element. The element is adapted to form a strand retaining portion. The element is further adapted to form first and second projecting portions that extend from, the strand retaining portion. A recess is defined, between the first and second projecting portions, that is configured to receive the post elongate flange therein. An end of the first projecting portion is adapted to extend through, and interact with an edge of, a first aperture. An end of the second projecting portion is adapted to extend through, and interact with an edge of, a second aperture. When both projecting portion ends are inserted into the respective apertures, the apparatus, and thus the at least one strand, is secured to the post. In this seventh aspect, the first projecting portion is shorter than the second projecting portion.

The system of the seventh aspect is characterised in that the apparatus may be secured to the post in an inverted position. In this regard, the end of the first projecting portion may extend through, and interact with an edge of, the second aperture (as opposed to the first aperture). Similarly, the end of the second projecting portion may extend through, and interact with an edge of, the first aperture (as opposed to the second aperture) so as to secure the apparatus to the post. This provides two configurations in which a single apparatus can be attached to the post, using a given aperture pair. This, therefore, provides two locations at which the strand retaining portion (and thus the strand) can be located, with respect to the aperture pair. The aperture pair may be adjacent apertures, or they may be spaced apertures. The system of the seventh aspect may be otherwise as defined in the fifth or sixth aspects.

In an eighth aspect there is disclosed a method for securing at least one strand to a post. The post may be of the type that comprises at least one elongate flange having at least two apertures therethrough. The post may also take the form of a picket. The method may find particular application in fencing, to secure wire strands to a fence post, though can be employed in other applications. The method comprises:

(I) positioning an end of a first projecting portion of an elongate element such that it extends through a first aperture of the post and interacts with an edge thereof;

(II) positioning the at least one strand at a strand retaining portion of the elongate element; and (III) positioning an end of the second projecting portion, which is longer than the first projecting portion, of the elongate element such that it extends through a second aperture of the post and interacts with an edge thereof. The first and second projecting portions are positioned such that they straddle the elongate flange. The elongate element thus engages and secures the at least one strand to the post.

The method of the eighth aspect is characterised in that the elongate element can be secured to the post in an inverted position. For example, the end of the first projecting portion can extend through, and interact with an edge of, the second aperture (as opposed to the first aperture). Similarly, the end of the second projecting portion can extend through, and interact with an edge of, the first aperture (as opposed to the second aperture) so as to secure the element to the post. This provides two configurations in which a single elongate element can be attached to the post, using a given aperture pair. This, therefore, provides two locations at which the strand retaining portion (and thus the strand) can be located, with respect to the aperture pair. The aperture pair may be adjacent apertures, or they may be spaced apertures.

The method of the eighth aspect may be otherwise as defined in the third or fourth aspects.

Whilst reference in the first to eighth aspects is made to a strand retaining portion, in an alternative form the retaining portion may be adapted to retain items other than a strand. For example, the retaining portion may be adapted to retain an item inserted therein. Examples of such inserts may include an insulator (which may then be adapted to retain a strand), or a projection (which may then be adapted to display or hold signage, or a drooping or floppy projection, etc), or other item.

In this regard, and in a ninth aspect, there is disclosed apparatus for attachment to a post. The apparatus finds particular application in attaching items, such as reflectors, to a post, though can be employed in other applications. The post may be of the type that comprises at least one elongate flange having at least two apertures therethrough. The flange may project out from, for example, a central longitudinal axis of the post. The post may have up to three (or more) elongate flanges that each project from the central longitudinal axis of the post, and may take the form of a Y- or T-post. The flange with the at least two apertures therethrough may comprise a stalk or stem of the Y- or T-post (although other flanges of the post may be employed). The stalk is generally the major (or larger) of the flanges in a Y- or T-post. Further, the post may also take the form of a picket.

In accordance with the ninth aspect, the apparatus comprises an elongate element. The element is adapted to form a retaining portion. The element is also adapted to form first and second projecting portions that extend from the retaining portion. A recess is defined, between the first and second projecting portions, and configured to receive the post elongate flange therein. An end of the first projecting portion is adapted to comprise a hook with two leg portions that extend through, and interact with an edge of, a first aperture in the post. An end of the second projecting portion is adapted to comprise a hook with two leg portions that extend through, and interact with an edge of, a second aperture in the post. This attaches the apparatus to the post. Any item located in the retaining portion of the apparatus is thus secured to the post, when the apparatus is attached thereto.

For example, the retaining portion may be adapted to retain an insert which can be inserted into the retaining portion, either before or after the apparatus has been attached to the post. The insert may be further adapted, such that it can display or hold signage, or another marker, indicator, reflector or visual notice. Alternatively, the insert may be further adapted to extend, project, secure, or attach other items to the post. For example, a floppy projection may extend from the insert, which may be used to prevent wildlife from climbing over the fence. Additionally, the insert may also be adapted to receive and retain an elongate strand thereat (i.e. the insert may be multi-functional in that it can both act as an insert and as a securement point for a fencing wire).

The apparatus disclosed in the ninth aspect may be otherwise as defined in the first or second aspect. Similarly, the apparatus disclosed in the ninth aspect may be employed in the method of the third, fourth or eighth aspects, or in the systems of the fifth, sixth or seventh aspects.

In the apparatus, method and system as disclosed herein, the at least one strand can comprise fencing wire, and the post can comprise a fence post, whereby a principal (though not exclusive) application of the apparatus, method and system is in fencing.

In the apparatus, method and system as disclosed herein, the retaining portion may be adapted to suit the intended application. For example, the retaining portion may be relatively large to accommodate wires/rods/etc of larger diameters, or where the positioning of a strand may be variable. For example, where the application is barbed wire fencing, the strand retaining portion may be larger to provide increased coverage (i.e. so that there is more space to capture the barbed wire to attach to the post, and also so there is more space to allow the barb to be repositioned by pulling the barb through the strand retaining portion).

In the apparatus, method and system as disclosed herein, the post and apparatus may each be formed from a metal such as steel, aluminium etc, or may comprise a plastic. For example, whilst usually the entire post is formed from a single such material, the apparatus may comprise one or a combination of materials (e.g. a metal and a plastic).

In a usual mode the post and at least parts of the apparatus are formed from a relatively non-deformable metal such as high carbon steel. Such components may optionally be galvanised otherwise or coated, as described above.

BRIEF DESCRIPTION OF THE DRAWINGS

Notwithstanding any other forms which may fall within the scope of the apparatus, method and system as defined in the Summary, specific embodiments will now be described, by way of example only, with reference to the accompanying drawings in which:

FIG. 1 shows a perspective schematic detail of a first apparatus and system embodiment;

FIGS. 2A, 2B and 2C respectively show side, end and side views, in schematic detail, of the apparatus and system embodiment shown in FIG. 1;

FIG. 3 shows a perspective schematic detail of the first apparatus embodiment;

FIG. 8 shows a side schematic view of a third apparatus embodiment;

FIGS. 9A and 9B respectively show side and perspective schematic views of the apparatus shown in FIG. 8 with an additional insulating component;

FIG. 10 shows, a side view, in schematic detail, of a system utilising the apparatus shown in FIGS. 8 and 9.

DETAILED DESCRIPTION OF SPECIFIC EMBODIMENTS

Figure 4:
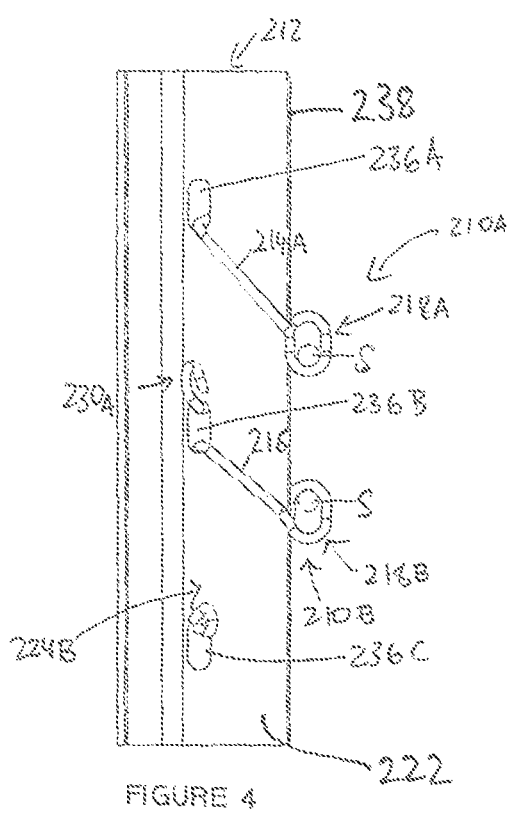
FIG. 4 shows a system utilising two apparatus, as shown in the first apparatus and system embodiment.

Various embodiments of an apparatus and system that secure at least one item; such as a strand, to a post will now be described with reference to FIGS. 1 to 11. The apparatus and system will be described in relation to the securing of wire strands to a fence post though, as mentioned above, it should be remembered that the apparatus and system are not limited to fencing-related applications. For example, the apparatus and system may be employed to secure an item, such as a reflector, to a post.

Embodiment 1

Referring firstly to FIG. 1, a perspective schematic detail of a first embodiment of an apparatus and system is shown. FIGS. 2A to 2C show, respectively, side, end and side schematic details of the first apparatus and system embodiment. The apparatus comprises an elongate element in the form of a clip 210 for securing a strand S to a post 212. The clip 210 may be formed of an elongate wire or rod. Such a wire or rod may be formed of high carbon steel. Additionally, or alternatively, the clip 210 may be stress relief heat treated to improve retention of its shape, may be formed of an insulating material, or may be a metal coated with an insulating material.

The clip 210 is shown in FIG. 3 having a first projecting portion, in the form of a first leg 214 and a second projecting portion, in the form of a second leg 216, with a strand retaining portion 218 therebetween. The first leg 214 is shorter than the second leg 216, and is shown extending upwardly from the strand retaining portion 218. The second leg 216, which is longer than the first leg 214, is shown extending downwardly from the strand retaining portion 218. A recess 220 is formed between the first and second legs 214, 216. The post 212 elongate flange 222 can be received in the recess 220 between the first and second legs 214, 216, as shown FIGS. 1 and 2B.

The end, in the form of foot 224, of the first leg 214 is shown as a hook having two portions 226, 228. Foot 224 generally extends away from the first leg 214 towards the second leg 216. Similarly, the end, in the form of foot 230, of the second leg 216 is shown as a hook having two portions 232, 234. Foot 230 generally extends away from the second leg 216 towards the first leg 214. In FIGS. 1 and 2, the feet 224, 230 of the first and second legs 214 and 216, respectively, extend through vertically adjacent apertures 236A, 236B in the flange 222 of the post 212. Whilst the first leg 214 is shown extending from the strand retaining portion 218 in an upwardly direction, with respect to the second leg 216, and the second leg 216 is shown extending from the strand retaining portion 218 in a downwardly direction, with respect to the first leg 214, the first and second legs 214, 216 may be biased towards each other (i.e. leg 214 may be biased downwardly toward leg 216, and leg 216 may be biased upwardly toward leg 214). This is so the feet 224, 230 of the clip 210 are ordinarily (i.e. prior to being attached to the post) spaced vertically closer together than the vertical distance between apertures 236A and 236B. Due to this natural bias, once attached to the post 212, the legs 214, 216 are acting against the lower and upper edges, respectively, of the apertures 236A and 236B. This assists in retaining the clip 210 on the post 212.

The legs 214, 216 may also be slightly biased away, outwardly, from each other (i.e. away from the post 212) so that, once attached to the post 212, the feet 224, 230 are biased into contact with (i.e. to engage) the flange 222 of the post 212.

The hook portions 226, 228 of foot 224 are bent towards each other, forming the bulbous looped end. The two hook portions 226, 228 are bent such that the bulb 239, when viewed side-on, is wider than the aperture 236. Similarly, the two hook portions 232, 234 of foot 230 are bent towards each other, forming the bulbous looped end. The two hook portions 232, 234 are bent such that the bulb 240, when viewed side-on, is wider than the aperture 236. However, in the embodiment shown, foot 224 is wider than foot 230 (i.e. the bulb 239 of foot 224 is not as tightly formed as the bulb 240 of foot 230).

Feet 224 and 230 are also shown being oriented, or angled, in different manners. This can assist with attachment (i.e. mounting) of the clip 210 to the post 212. For example, foot 230 is more angled than foot 224. In this regard, when the clip 210 is formed from e.g. a straight metal wire, the hooked portion 234 is bent to form the tight bulb 240 with hooked portion 232 (which would otherwise form part of the second leg 216). This bulb 240 is then twisted to be substantially perpendicular to second leg 216 (or, alternatively, so that it is angled back towards the strand retaining portion 218). Foot 224, however, is formed by bending hooked portion 228 to form the looser, wider bulb 239 with hooked portion 226. The bulb is also bent back towards a plane perpendicular to leg 214. The angle to which bulb 239 is bent is less than that of bulb 240. When attaching the clip 210 to the post 212, it may be preferred to insert foot 230 into aperture 236B prior to inserting foot 224 into aperture 236A, as the higher angle of foot 230 may make it more difficult to attach second. Although, it should be appreciated that various configurations of feet 224 and 230 are envisaged, and so this may not be the preferred attachments means for all envisaged configurations.

It should also be noted that having one leg 214 shorter than the other leg 216 can also assist in attaching the clip 210 to the post 212. For example, and as best shown in FIG. 3, the strand retaining portion 218 may be in the form of a single coil (or revolution) of a spiral, with the legs 214 and 216 extending from opposite ends thereof. Further, legs 214 and 216 are biased, in the in use vertical direction, towards each other. This may make it difficult to insert a foot (i.e. 224 or 230) after a first foot (i.e. 230 or 224) has already been inserted through an aperture 236. However, the offset nature of the strand retaining portion 218 (i.e. the fact that one leg 214 is shorter than the other leg 216) allows it to be used as a fulcrum point to leverage the other leg, and thus enable its foot to be inserted through the aperture.

Once the clip 210 and strand S are secured to the post 212, if a force is applied to the strand S, the strand S will generally tend to pull the clip 210 away from the flange 222 (i.e. away from the distal edge 238). As the feet 224, 230 are wider than the aperture 236, it is difficult for the clip 210 to become accidentally dislodged from the post 212. This assists in retaining the both the clip and the strand at the post.

The strand retaining portion 218 is generally positioned against the distal edge 238 of the flange 222. As the first leg 214 is shorter than the second leg 216, the strand retaining portion 218, when the clip 210 is attached to the post, is positioned closer to aperture 236A than aperture 236B. It is possible to reverse the way in which the clip 210 is mounted to the post 212, however, such that the strand retaining portion 218 is closer to aperture 236B.

Whilst FIG. 4 shows two such clips 210 attached (or mounted) to the post 212, a number of similar clips may be used at various other apertures along the length of the post.

FIG. 4 shows a first clip 210A attached to the post 212 in a 'reversed' configuration (compared to the system shown in FIGS. 1 and 2). Clip 210A is 'reversed' in that the strand retaining portion 218A is shown closer to the lower aperture 236B than the upper aperture 236A. Clip 210B, on the other hand, is shown in the configuration shown in FIGS. 1 and 2 (i.e. the strand retaining portion 218B is shown closer to the upper aperture 236B than the lower aperture 236C, through which its ends 230B, 224B respectively extend). This can allow the adjacent strands S to be positioned more closely at various sections along the post 212. This can allow equally spaced apertures to be formed in the post 212, whilst still enabling variations in strand spacings. Whilst FIG. 4 shows clip 210A in a 'reversed' or inverted configuration with respect to clip 210B, both clips may be arranged so that they are inverted (when compared to, for example, the system shown in FIGS. 1 and 2). Alternatively, they may both be attached in the manner shown in FIGS. 1 and 2.

Whilst the apertures 236 in the flange 222 of post 212 are shown having an obround geometry (two semi-circles connected by parallel lines tangent to their endpoints), the apertures may be of any suitable shape, such as circular, triangular, rectangular, dog-boned, etc.

Embodiment 2

Figure 5:
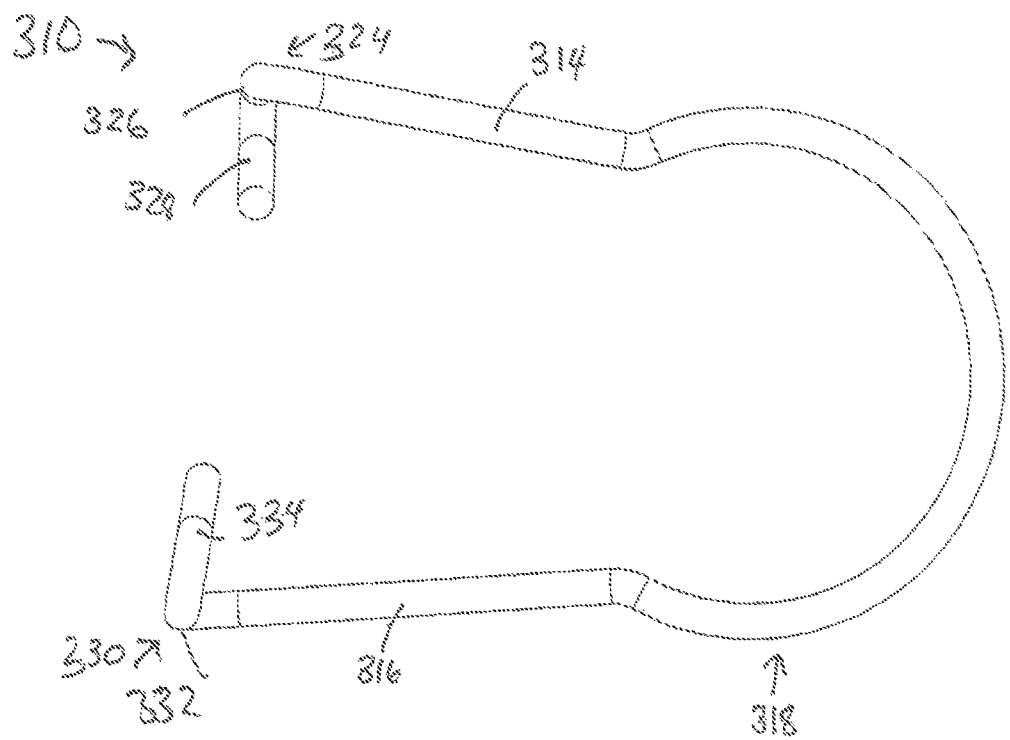
FIG. 5 shows a side schematic view of a second apparatus embodiment.
Figure 6:
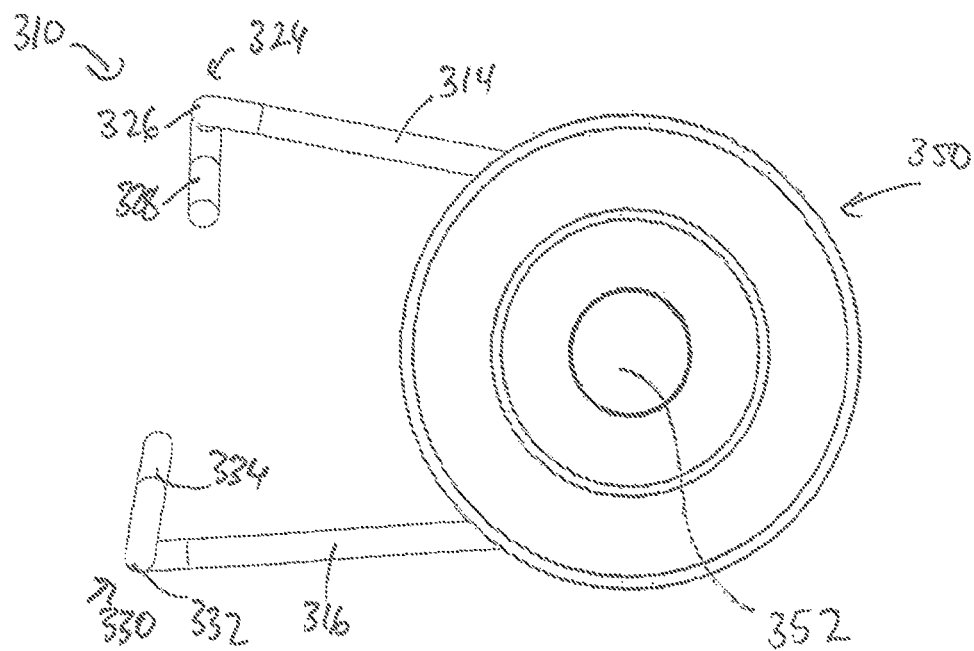
FIG. 6 shows a side schematic view of the apparatus shown in FIG. 5 with an additional insulating component.
Figure 7A:
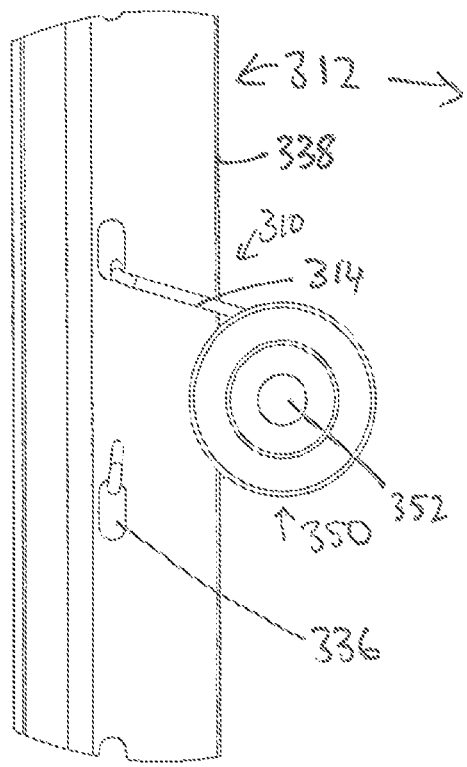
FIGS. 7A, 7B and 7C respectively show side, perspective and top views, in schematic detail, of a system utilising the apparatus shown in FIGS. 5 and 6.
Figure 7B:
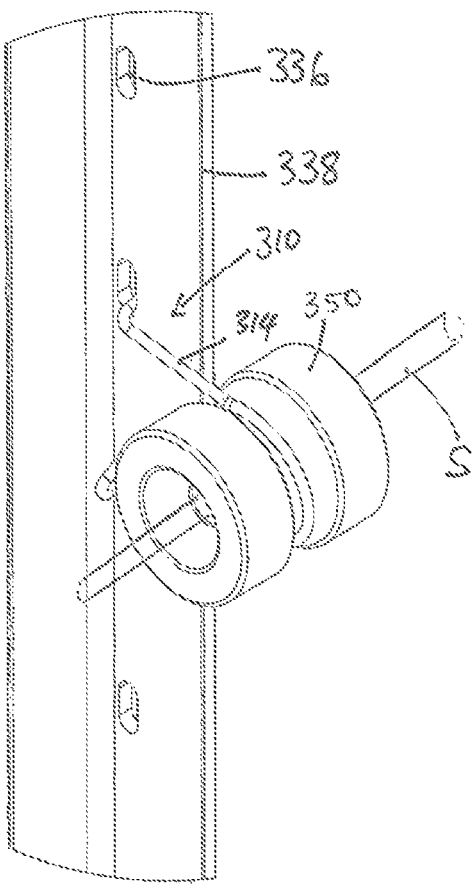
Figure 7C:
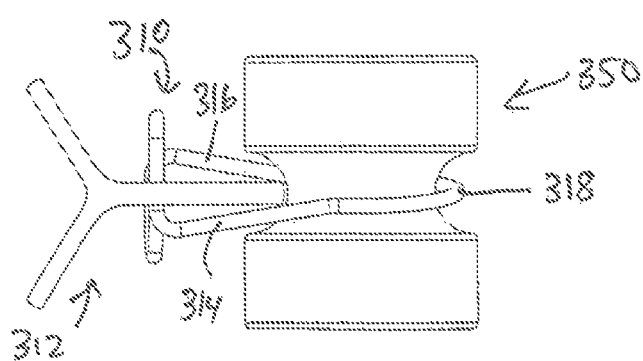

Referring now to FIGS. 5 to 7, a second embodiment of an apparatus is shown. The apparatus, as best shown in FIG. 5, comprises an elongate element in the form of a clip 310 for securing a strand to a post 312. The clip 310 may be formed of an elongate wire or rod. Such a wire or rod may be formed of high carbon steel. Additionally, or alternatively, the clip 310 may be stress relief heat treated to improve retention of its shape, may be formed of an insulating material, or may be a metal coated with an insulating material. FIG. 6 shows a side schematic detail of a clip 310 with an additional insulating component 350, and FIGS. 7A to 7C show, respectively, side, perspective and top schematic details of the second apparatus in use in a second system embodiment.

The clip 310 shown in FIG. 5 is similar to clip 210 described in the first embodiment, and thus like reference numerals (with 100 being added thereto, such that 214 will become 314, etc) will be used to describe like parts.

Clip 310 differs from clip 210 in that the first and second legs 314, 316, respectively, are of similar lengths, and strand retaining portion 318 is somewhat larger and rounder. The semi-circular nature of the strand retaining portion 318, from which legs 314 and 316 extend, allows the insulating component 350 to be positioned therein (as shown in FIGS. 6 and 7). The use of an insulating component 350 in the system allows an electrified strand to be passed through central aperture 352, thereby spacing the electrified strand from a distal edge 338 of the elongate flange 322 of the post 312, as well as the clip 310 itself. This can allow the clip 310 to be formed of a metal, whilst still insulating an electrified wire therefrom.

In this embodiment, in the in use vertical direction, the legs 314 and 316 are again biased toward each other. As they are so biased, the feet 324 and 330 are angled to project towards the opposite leg. This enables, for example, foot 324 of leg 314 to interact with a lower edge of an aperture 336A, whilst foot 330 of leg 316 interacts with an upper edge of an aperture 336B, to assist in retaining both the clip 310 and the strand S at the post 312.

Whilst FIG. 7 shows one such clip 310 attached (or mounted) to the post 312, a number of similar clips may be used at various other apertures along the length of the post.

Whilst the apertures 336 in the flange 322 of post 312 are shown having an obround geometry (two semi-circles connected by parallel lines tangent to their endpoints), the apertures may be of any suitable shape, such as circular, triangular, rectangular, dog-boned, etc.

In an alternative use of the second embodiment apparatus, clip 310 may be employed (for example, without the insulating component 350) to secure a barbed wire strand to the post. This may provide a safer alternative to conventional wire ties as the barbed wire is securable further away from the post and, in the event of wire breakage, the enlarged strand retaining portion 318 allows the barbs to be safely pulled therethrough for replacement. Additionally, the larger strand retaining portion can provide an increased space or area within which to secure the strand. In a further alternative use of the second embodiment apparatus, the insulating component 350 may be substituted with an alternative insert component (that may, or may not, be formed from an insulating material). Such an insert component may allow the clip 310 to secure items, other than a strand, to the post. For example, an insert component may be adapted to display a reflector that may be used in roadside post applications.

Embodiment 3

Referring now to FIGS. 8 to 10, a third embodiment of an apparatus is shown. The apparatus, as best shown in FIG. 8, comprises an elongate element in the form of a clip 410 for securing a strand to a post 412. The clip 410 may be formed of an elongate wire or rod. Such a wire or rod may be formed of high carbon steel. Additionally, or alternatively, the clip 410 may be stress relief heat treated to improve retention of its shape, may be formed of an insulating material, or may be a metal coated with an insulating material. FIGS. 9A and 9B respectively show a side and perspective schematic detail of clip 410 with an additional insulating component 450, and FIG. 10 shows a perspective schematic detail of the third apparatus in use in a third system embodiment.

The clip 410 shown in FIG. 8 is similar to clip 310 described in the third embodiment, and thus like reference numerals (with 100 being added thereto, such that 314 will become 414, etc) will be used to describe like parts.

Clip 410 is similar to clip 310 in that the first and second legs 414, 416, respectively, are of similar lengths, and strand retaining portion 418 is substantially rounded. However, in this embodiment, legs 414 and 416 are, in the in use vertical direction, biased away from each other. The strand retaining portion 418 therefore narrows slightly at that part which will be positioned near a distal edge 438 of the flange 422 of post 412. The roundness of the strand retaining portion 418 allows the insulating component 450 to be positioned therein (as shown in FIGS. 9 and 10). The use of an insulating component 450 in the system allows an electrified strand to be passed through central aperture 452, thereby spacing the electrified strand from a distal edge 438 of the elongate flange 422 of the post 412.

Clip 410 differs from clip 310 in the way in which clip 410 attaches (or mounts) to the apertures 436 of post 412. The end 424 of the first leg 414 is shown as a hook having two portions 426, 428. The first hook portion 426 generally extends away from the first leg 414, and the second hook portion 428 generally extends back toward the first leg 414. Similarly, the end 430 of the second leg 416 is shown as a hook having two portions 432, 434. The first hook portion 432 generally extends away from the second leg 416, and the second hook portion 434 generally extends back toward the second leg 416. In FIG. 10 the ends 424, 430 of the first and second leg 414 and 416, respectively, extend through vertically adjacent apertures 436A, 436B in the flange 422 of the post 412.

In contradistinction to clip 310, shown in FIG. 7, end 424 of clip 410 interacts with an upper portion of aperture 436A and end 430 interacts with a lower portion of aperture 436B. In this regard, and as described above, the first and second legs 414, 416 may be biased away from each other. This is so the ends 424, 430 of the clip 410 are ordinarily (i.e. prior to being attached to the post) spaced further apart than the vertical distance between apertures 436A and 436B. Due to this natural bias, once attached to the post 412, the legs 414, 416 are acting against the upper and lower edges, respectively, of the apertures 436A and 436B. This assists in retaining the clip 410 on the post 412.

The legs 414, 416 may also be slightly biased away, outwardly, from each other (i.e. away from the post 412) so that, once attached to the post 412, the ends 424, 430 are biased into contact with (i.e. to engage) the flange 422 of the post 412.

The hook portions 426, 428 of end 424, and the hook portions 432, 434 of end 430 may be otherwise as described and shown in relation to the first and second clip embodiments 210, 310.

Whilst FIG. 10 shows one such clip 410 attached (or mounted) to the post 412, a number of similar clips may be used at various other apertures along the length of the post.

Whilst the apertures 436 in the flange 422 of post 412 are shown having an obround geometry (two semi-circles connected by parallel lines tangent to their endpoints), the apertures may be of any suitable shape, such as circular, triangular, rectangular, dog-boned, etc.

As with clip 310, the insulating component 450 may be substituted with an alternative insert component (not shown), to allow the clip to be used to secure other items to a post. Additionally, the clip 410 may be employed without the insulating component 450 to secure a barbed wire, or a larger diameter wire, to a post.

Embodiment 4

Figure 11A:
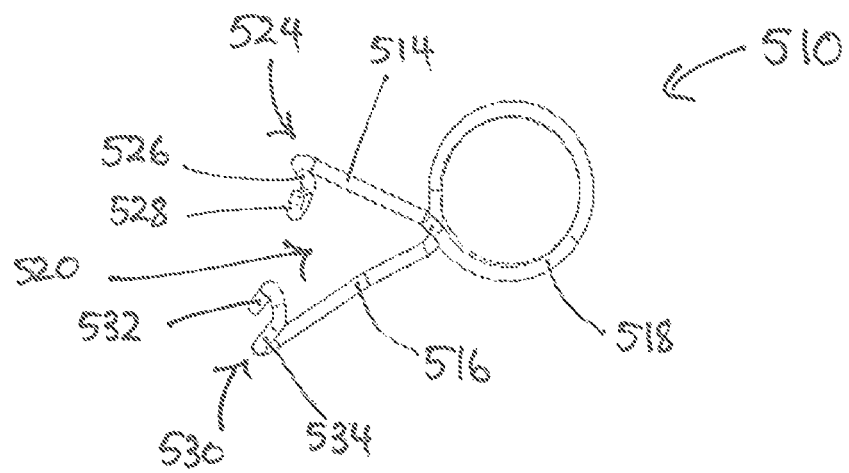
FIGS. 11A and 11B respectively show side and end schematic views of a fourth apparatus embodiment.
Figure 11B:
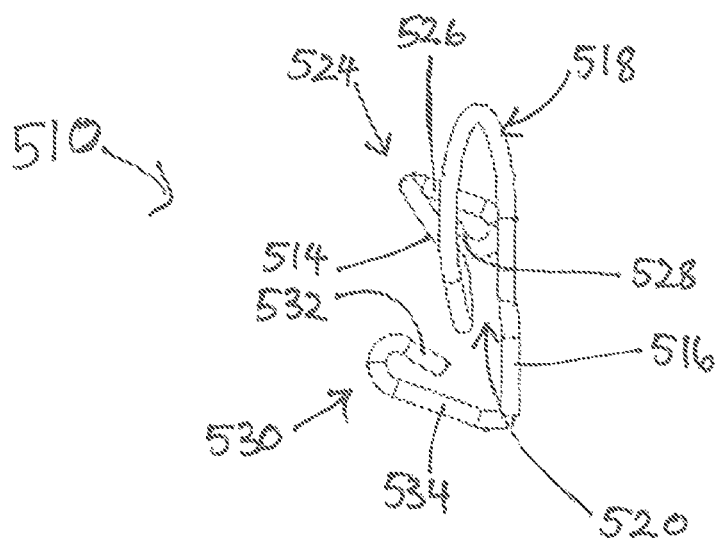

Referring now to FIGS. 11A and 11B, a fourth embodiment of an apparatus is shown. The apparatus comprises an elongate element in the form of a clip 510 for securing a strand to a post (not shown). The clip 510 may be formed of an elongate wire or rod. Such a wire or rod may be formed of high carbon steel. Additionally, or alternatively, the clip 510 may be stress relief heat treated to improve retention of its shape, may be formed of an insulating material, or may be a metal coated with an insulating material.

The clip 510 shown in FIGS. 11A and 11B has aspects which are similar to both clip 210, described in the first embodiment, and clip 310, described in the second embodiment, and thus like reference numerals (with the numeral '5' prefacing the like features instead of '2' and '3', such that 214, 314 will become 514, etc) will be used to describe like parts.

Clip 510 is similar to clip 210 in that the first and second legs 514, 516 are of different lengths. The first leg 514 is shorter than the second leg 516, and is shown extending upwardly from the strand retaining portion 518. The second leg 516, which is longer than the first leg 514, is shown extending downwardly from the strand retaining portion 518. This can allow the position of the strand retaining portion to be altered with respect to the pair of apertures to which the clip is being attached.

Clip 510 is similar to clip 310 in that the strand retaining portion 518 is larger and rounder than the strand retaining portion 218 of clip 210. This may be a more appropriate apparatus configuration for use with, for example, barbed wires as the larger retaining portion 518 provides an increased area at which the wire can be retained. A recess 520 is formed between the first and second legs 514, 516 allowing a post elongate flange to be received therein.

In this embodiment, the hook portions 526, 528 of foot 524 are bent towards each other, forming a bulbous looped end. The two hook portions 532, 534 of foot 530 are bent towards each other, such that the two hook portions are substantially parallel with a looped end.

Clip 510 may be otherwise similar to clip 210, including that legs 514, 516 may be biased towards each other (i.e. leg 514 may be biased downwardly toward leg 516, and leg 516 may be biased upwardly toward leg 514). This bias may be provided to enhance the securement of the clip 510 to the post.

In the apparatus and systems as described above in FIGS. 1 to 11, each of the clips 210, 310, 410, 510 can be formed from the same stock of resilient material to be bent, deformed and/or flexed in use to support or secure the one or more strands S to the post. Such stock can comprise, for example, wire or rod formed from optionally galvanised spring steel.

Further, whilst each of the strand retaining portions 218, 318, 418, 518 are shown as retaining one strand S only, the strand retaining portions may be adapted to retain more than one strand S. For example, the strand retaining portion 218 may be adapted to include a further looped section, such that the two sections are vertically spaced when the clip 210 is attached to the post. The two strand retaining sections of a single clip 210 could then be used to attach two strands S to the post.

The apparatus and systems as described above in relation to FIGS. 1 to 11 have been designed to reduce the degree of manual labour in securing one or more strands to a post, and to enable simple and rapid attachment of wire strands to a post by the user (i.e. in the field). The apparatus and systems can eliminate the services of a skilled fencer. The apparatus and systems may also reduce the number of special tools required, although a tool may be used to reduce time taken to attach the apparatus to the post, or to reduce the effort required by a user.

The apparatus and systems as described above in FIGS. 1 to 11 have been specifically designed for posts having at least one elongate flange and typically three elongate flanges extending along its length (e.g. Y- and T-posts, etc).

EXAMPLES

Non-limiting Examples of a method and system for securing at least one strand to a post will now be described, with reference to the various embodiments of the apparatus and system as shown in FIGS. 1 to 11.

In a general sense the methods comprised the steps:

1. Positioning one or multiple strands S at a strand retaining portion (218, 318, 418, 518) of an elongate element (e.g. clips 210, 310, 410, 510).

2. Attaching one end (e.g. foot 224, 324, 424, 524) of an elongate element (e.g. clips 210, 310, 410, 510) to an aperture (236A, 336A, 436A, 536A) in the flange (222, 322, 422, 522) of the post (212, 312, 412, 512).

3. Attaching an opposite end (e.g. foot 230, 330, 430, 530) of the elongate element (e.g. clip 210, 310, 410, 510) to another aperture (236B, 336B, 436B, 536B) in the flange (222, 322, 422, 522) of the post (212, 312, 412, 512).

In such methods the elongate element was able to engage and secure (i.e. retain) the strands at a position between the desired apertures.

As will become clear from Examples 1 to 4, steps 1. and 2. were able to be reversed, or to occur simultaneously. The step 2. attachment was able to occur after step 3., or step 2. was able to occur before steps 1. and 3. The steps 1., 2. and 3. were, in some instances, even able to occur simultaneously. Additionally, in steps 1. and 2. the aperture to which the end was attached may be substituted (e.g. end/foot 224, 324, 424, 524 may be attached to aperture 236B, 336B, 436B, 536B, and end/foot 230, 330, 430, 530 may be attached to aperture 236A, 336A, 436A, 536A.

In any case, such methods were observed to reduce the degree of manual and skilled labour, and the need for a number of specialised tools, when securing strands to a post, in that the strand(s) were able to be located and the element simply and rapidly fitted by the user in the field. Although, in some instances, use of a specialised tool may be preferred, to further simplify the attachment process, the use of such a tool is not described herein.

Example 1

A Y-post 212 for use in an agricultural fence was selected together with a clip 210. In this application, a three-stranded wire fence was required, so three clips per post were employed. The three wires were required to be equally spaced along the post.

Each post was suitably spaced and was driven ("sunk") into place in the earth with a fence post driver. Each elongate flange 222 was arranged such that a suitable "facing" of the resultant wires was achieved. The respective locations for each of the wire strands above the ground were noted (e.g. marked) with reference to the elongate apertures 236 along the flange 222.

A first strand $S_1$ was loaded into the strand retaining portion 218A of clip 210A. Clip 210A was then positioned at the flange 222 of the post 212, near the marked apertures 236A and 236B. The legs 214A, 216A of the clip 210A were slightly separated so that the recess 220A of clip 210A received the flange 222 therebetween. The foot 224A of upper leg 214A was inserted through the aperture 236A, by slightly twisting the clip 210A, so that hooked portions 226A, 228A were adjacent the flange 222 (on the opposite side thereof to the leg 214A) and interacted with the lower edge of aperture 236A.

Leg 216A was then pushed down, and the clip 210A slightly twisted, until its foot 230A was aligned with the aperture 236B, allowing foot 230A to be inserted thereinto. The hooked portions 232A, 234A were adjacent the flange 222 (on the opposite side thereof to the leg 216A) and interacted with the upper edge of aperture 236B. This thereby attached the clip 210A to the Y-post 212.

A second strand $S_2$ was loaded into the strand retaining portion 218B of clip 210B. Clip 210B was then positioned at the flange 222 of the post 212, near the marked apertures 236B and 236C. The legs 214B, 216B of the clip 210B were slightly separated so that the recess 220B of clip 210B received the flange 222 therebetween. The foot 224B of upper leg 214B was inserted through the aperture 236B, by slightly twisting the clip 210B, so that hooked portions 226B, 228B were adjacent the flange 222 (on the opposite side thereof to the leg 214B) and interacted with the lower edge of aperture 236B.

Leg 216B was then pushed down, and the clip 210B slightly twisted, until its foot 230B was aligned with the aperture 236C, allowing end 230B to be inserted thereinto. The hooked portions 232B, 234B were adjacent the flange 222 (on the opposite side thereof to the leg 216B) and interacted with the upper edge of aperture 236C. This thereby attached the clip 210I1 to the Y-post 212.

A third strand $S_3$ was loaded into the strand retaining portion 218C of clip 210C. Clip 210C was then positioned at the flange 222 of the post 212, near the marked apertures 236C and 236D. The legs 214C, 216C of the clip 210C were slightly separated so that the recess 220C of clip 210C received the flange 222 therebetween. The foot 230C of lower leg 216C was inserted through the aperture 236D, by slightly twisting the clip 210C, so that hooked portions 232C, 234C were adjacent the flange 222 (on the opposite side thereof to the leg 216C) and interacted with the upper edge of aperture 236D.

Leg 214C was then pushed up, and the clip 2100 slightly twisted, until its foot 224C was aligned with the aperture 236C, allowing end 224C to be inserted thereinto. The hooked portions 226C, 228C were adjacent the flange 222 (on the opposite side thereof to the leg 214C) and interacted with the lower edge of aperture 236C. This thereby attached the clip 210C to the Y-post 212.

In a variation, at least some of the clips 210 had a strand of barbed wire loaded into the strand retaining portion 218 to then also be secured onto the post.

Example 2

A Y-post 212 for use in an agricultural fence was selected together with a clip 210. In this application, a five-stranded wire fence was required, so five clips per post were employed. The lower two wires were required to be closely spaced, with a larger spacing between the lowermost wire and the ground. The upper three wires were required to be spaced evenly along the post, with the middle wire and next lower wire having a larger spacing therebetween.

Each post was suitably spaced, sunk and then marked as per Example 1. A first strand $S_1$ was loaded into the strand retaining portion 218E of clip 210E. Clip 210E was then positioned at the flange 222 of the post 212, near the lowermost marked apertures 236E and 236F. The legs 214E, 216E of the clip 210E were slightly separated so that the recess 220E of clip 210E received the flange 222 therebetween. The foot 224E of upper leg 214E was inserted through the aperture 236E, by slightly twisting the clip 210E, so that hooked portions 226E, 228E were adjacent the flange 222 (on the opposite side thereof to the leg 214E) and interacted with the lower edge of the second lowermost aperture 236E.

Leg 216E was then pushed down, and the clip slightly twisted, until its foot 230E was aligned with the lowermost aperture 236F, allowing foot 230E to be inserted thereinto. The hooked portions 232E, 234E were adjacent the flange 222 (on the opposite side thereof to the leg 216E) and interacted with the upper edge of aperture 236F. This thereby attached the clip 210E to the Y-post 212 and secured the strand S thereto.

A second strand $S_2$ was loaded into the strand retaining portion 218D of clip 210D. Clip 210D was then positioned at the flange 222 of the post 212, near the marked apertures 236D and 236E. The legs 214D, 216D of the clip 210D were slightly separated so that the recess 220D of clip 210D received the flange 222 therebetween. In attaching clip 210D to the post 212, the clip 210D was turned upside down, so that the foot 224D of leg 214D was located closer to the lower aperture 236E and the foot 230D of leg 216D was located closer to the middle aperture 236D. This allowed the strand retaining portion 218D of clip 210D to be closely spaced with the strand retaining portion 218E of clip 210E.

The end 224D of leg 214D was inserted through the aperture 236E, by slightly twisting the clip 210D, so that hooked portions 226D, 228D were adjacent the flange 222 (on the opposite side thereof to the leg 214D) and interacted with the upper edge of aperture 236E. Leg 216D was then pushed up, and the clip slightly twisted, until its foot 230D was aligned with the aperture 236D, allowing foot 230D to be inserted thereinto. The hooked portions 232D, 234D were adjacent the flange 222 (on the opposite side thereof to the leg 216D) and interacted with the lower edge of aperture 236D. This thereby attached the clip 210D to the Y-post 212 and secured the strand $S_2$ thereto.

A third strand $S_3$ was loaded into the strand retaining portion 218C of clip 210C. Clip 210C was then positioned at the flange 222 of the post 212, near the apertures 236C and 236D. The legs 214C, 216C of the clip 210C were slightly separated so that the recess 220C of clip 210C received the flange 222 therebetween. The foot 230C of lower leg 216C was inserted through the aperture 236D, by slightly twisting the clip 210C, so that hooked portions 232C, 234C were adjacent the flange 222 (on the opposite side thereof to the leg 216C) and interacted with the upper edge of aperture 236D.

Leg 214C was then pushed up, and the clip slightly twisted, until its foot 224C was aligned with the aperture 236C, allowing foot 224C to be inserted thereinto. The hooked portions 226C, 228C were adjacent the flange 222 (on the opposite side thereof to the leg 214C) and interacted with the lower edge of aperture 236C. This thereby attached the clip 210C to the Y-post 212 and secured the strand. $S_3$ thereto. This provided a somewhat larger spacing between strands $S_2$ and $S_3$ (as strand $S_2$ was located in closer proximity to aperture 236E, and strand $S_3$ was located in closer proximity to aperture 236C).

A fourth strand $S_4$ was loaded into the strand retaining portion 218B of clip 210B. Clip 210E was then positioned at the flange 222 of the post 212, near the apertures 236B and 236C. The legs 214B, 216B of the clip 210E were slightly separated so that the recess 220B of clip 210B received the flange 222 therebetween. The foot 230B of lower leg 216B was inserted through the aperture 236C, by slightly twisting the clip 210B, so that hooked portions 232B, 234B were adjacent the flange 222 (on the opposite side thereof to the leg 216B) and interacted with the upper edge of aperture 236C.

Leg 214B was then pushed up, and the clip slightly twisted, until its foot 224B was aligned with the aperture 236B, allowing foot 224B to be inserted thereinto. The hooked portions 226B, 228B were adjacent the flange 222 (on the opposite side thereof to the leg 214B) and interacted with the lower edge of aperture 236B. This thereby attached the clip 210B to the Y-post 212 and secured the strand $S_4$ thereto.

A fifth, and final, strand $S_5$ was loaded into the strand retaining portion 218A of clip 210A. Clip 210A was then positioned at the flange 222 of the post 212, near the uppermost marked apertures 236A and 236B. The legs 214A, 216A of the clip 210A were slightly separated so that the recess 220A of clip 210A received the flange 222 therebetween. The foot 230A of lower leg 216A was inserted through the aperture 236B, by slightly twisting the clip 210A, so that hooked portions 232A, 234A were adjacent the flange 222 (on the opposite side thereof to the leg 216A) and interacted with the upper edge of the aperture 236B.

Leg 214A was then pushed up, and the clip slightly twisted, until its foot 224A was aligned with the aperture 236A, allowing foot 224A to be inserted thereinto. The hooked portions 226A, 228A were adjacent the flange 222 (on the opposite side thereof to the leg 214A) and interacted with the lower edge of aperture 236A. This thereby attached the clip 210A to the Y-post 212 and secured the strand $S_5$ thereto.

Of the six apertures 236A, 236B, 236C, 236D, 236E, 236F in post 212, five clips 210A, 210B, 210C, 210D, 210E were attached thereto. The lower two strands, $S_1$ and $S_2$, were both located close to aperture 236E, whereas strands $S_5$, $S_4$ and $S_3$ were located close to apertures 236A, 236B and 236C, respectively. Thus, the spacing between strands $S_5$, $S_4$ and $S_3$ was constant.

Example 3

A Y-post 312 for use in an agricultural fence was selected together with a clip 310. In this application, a three-stranded electric wire fence was required, so three clips per post were employed. The three electric wires were required to be equally spaced along the post.

Each post was suitably spaced, sunk and then marked as per Example 1. A first strand $S_1$ was loaded through the central aperture 352A of the insulating component 350A. The insulating component 350A was then positioned at strand retaining portion 318A of clip 310A. Clip 310A was then positioned at the flange 322 of the post 312, near the marked apertures 336A and 336B. The legs 314A. 316A of the clip 310A were slightly separated so that the recess 320A of clip 310A received the flange 322 therebetween. The foot 330A of lower leg 316A was inserted through the aperture 336B, by slightly twisting the clip 310A, so that hooked portions 332A, 334A were adjacent the flange 322 (on the opposite side thereof to the leg 316A) and interacted with the upper edge of aperture 336B.

Leg 314A was then pushed up, and the clip 310A slightly twisted, until its foot 324A was aligned with the aperture 336A, allowing foot 324A to be inserted thereinto. The hooked portions 326A, 328A were adjacent the flange 322 (on the opposite side thereof to the leg 314A) and interacted with the lower edge of aperture 336A. This thereby attached the clip 310A to the Y-post 312.

A second strand $S_2$ was loaded through the central aperture 352B of the insulating component 350B. The insulating component 350B was then positioned at strand retaining portion 318B of clip 310B. Clip 310B was then positioned at the flange 322 of the post 312, near the marked apertures 336B and 336C. The legs 314B, 316B of the clip 310E were slightly separated so that the recess 320B of clip 310B received the flange 322 therebetween. The foot 324B of upper leg 314B was inserted through the aperture 336B, by slightly twisting the clip 310B, so that hooked portions 326B, 328B were adjacent the flange 322 (on the opposite side thereof to the leg 314B) and interacted with the lower edge of aperture 336B.

Leg 316B was then pushed down, and the clip 310B slightly twisted, until its foot 330B was aligned with the aperture 336C, allowing foot 330B to be inserted thereinto. The hooked portions 332B, 334B were adjacent the flange 322 (on the opposite side thereof to the leg 316B) and interacted with the upper edge of aperture 336C. This thereby attached the clip 310B to the Y-post 312.

A third strand $S_3$ was loaded through the central aperture 352C of the insulating component 350C. The insulating component 350C was then positioned at strand retaining portion 318C of clip 310C. Clip 310C was then positioned at the flange 322 of the post 312, near the marked apertures 336C and 336D. The legs 314C, 316C of the clip 310C were slightly separated so that the recess 320C of clip 310C received the flange 322 therebetween. The foot 330C of lower leg 316C was inserted through the aperture 336D, by slightly twisting the clip 310C, so that hooked portions 332C, 334C were adjacent the flange 322 (on the opposite side thereof to the leg 316C) and interacted with the upper edge of aperture 336D.

Leg 314C was then pushed up, and the clip slightly twisted, until its foot 324C was aligned with the aperture 336C, allowing foot 324C to be inserted thereinto. The hooked portions 326C, 328C were adjacent the flange 322 (on the opposite side thereof to the leg 314C) and interacted with the lower edge of aperture 336C. This thereby attached the clip 310C to the Y-post 312, and secured the strand. $S_3$ to the Y-post 312.

As each of the strands $S_1$, $S_2$ and $S_3$ had been spaced from the flange 322 by insulating components 350A, 350B and 350C, the strands were then electrified. This generally completed this part of the fencing operation.

Example 4

A Y-post 412 for use in an agricultural fence was selected together with a clip 410. In this application, a two-stranded electric wire fence was required, so two clips per post were employed. The two electric wires were required to be equally spaced along the post.

Each post was suitably spaced, sunk and then marked as per Example 1. A first strand $S_1$ was loaded through the central aperture 452A of the insulating component 450A. The insulating component 450A was then positioned at strand retaining portion 418A of clip 410A. Clip 410A was then positioned at the flange 422 of the post 412, near the marked apertures 436A and 436B. The legs 414A, 416A of the clip 410A were slightly separated so that the recess 420A of clip 410A received the flange 422 therebetween. The foot 430A of lower leg 416A was inserted through the aperture 436B, by slightly twisting the clip 410A, so that hooked portions 432A, 434A were adjacent the flange 422 (on the opposite side thereof to the leg 416A) and interacted with the lower edge of aperture 436B.

Leg 414A was then pushed toward leg 416A, and the clip slightly twisted, until its foot 424A was aligned with the aperture 436A, allowing foot 424A to be inserted thereinto. The hooked portions 426A, 428A were adjacent the flange 422 (on the opposite side thereof to the leg 414A) and interacted with the upper edge of aperture 436A. This thereby attached the clip 410A to the Y-post 412.

A second strand $S_2$ was loaded through the central aperture 452B of the insulating component 450B. The insulating component 450B was then positioned at strand retaining portion 418B of clip 410B. Clip 410B was then positioned at the flange 422 of the post 412, near the marked apertures 436C and 436D. The legs 414B, 416B of the clip 410B were slightly separated so that the recess 420B of clip 410B received the flange 422 therebetween. The foot 424B of upper leg 414B was inserted through the aperture 436C, by slightly twisting the clip 410B, so that hooked portions 426B, 4288 were adjacent the flange 422 (on the opposite side thereof to the leg 414B) and interacted with the upper edge of aperture 436C.

Leg 416B was then pushed toward leg 414B, and the clip slightly twisted, until its foot 430B was aligned with the aperture 436D, allowing foot 430B to be inserted thereinto. The hooked portions 432B, 434B were adjacent the flange 422 (on the opposite side thereof to the leg 416B) and interacted with the lower edge of aperture 436D. This thereby attached the clip 410B to the Y-post 412.

As each of the strands $S_1$ and $S_2$ had been spaced from the flange 422 by insulating components 450A and 450B, the strands were then electrified. This generally completed this part of the fencing operation.

Example 5

A Y-post for use in roadside fencing was selected together with a clip 310. In this application, a single reflector was required to be attached to the post, so one clip and one reflector insert per post were employed.

Each post was suitably spaced, sunk and then marked as per Example 1. A reflector insert was then positioned at the strand retaining portion 318 of clip 310. Clip 310 was then positioned at the flange of the post, near the marked apertures. The legs 314 and 316 of the clip 310 were slightly separated so that the recess 320 of clip 310 received the post flange therebetween. The foot 330 of lower leg 316 was inserted through the lower aperture, by slightly twisting the clip 310, so that hooked portions 332, 334 were adjacent the flange (on the opposite side thereof to the leg 316) and interacted with the upper edge of the lower aperture.

Leg 314 was then pushed up, and the clip 310 slightly twisted, until its foot 324 was aligned with the upper aperture, allowing foot 324 to be inserted thereinto. The hooked portions 326, 328 were adjacent the flange (on the opposite side thereof to the leg 314) and interacted with the lower edge of the upper aperture. This thereby attached the clip 310, and the reflector, to the Y-post.

Example 6

A Y-post for use in an agricultural fence was selected together with a clip 510. In this application, a four-stranded barbed wire fence was required, so four clips per post were employed. The lower three barbed wires were required to be equally spaced along the post, with the lowermost barbed wire being located close to the ground. A larger spacing was to be provided between the uppermost barbed wire and the second barbed wire.

Each post was suitably spaced, sunk and then marked as per Example 1. Each of the four strands of barbed wire ($S_{B1}$, $S_{B2}$, $S_{B3}$, $S_{B4}$) were rolled along the fence line and strained at respective ends thereof. As first barbed wire strand $S_{B1}$ was to be located near to the ground, clip 510D was positioned at the flange of the post, near the lower two marked apertures 536D and 536E, with leg 514D located closer to aperture 536E, and leg 516D located closer to aperture 536D. The legs 514D, 516D of the clip 510D were slightly separated so that the recess 520D of clip 510D received the flange therebetween, and the strand retaining portion 518D received barbed wire strand $S_{B1}$ therein. The foot 524D of leg 514D was inserted through the aperture 536E, by slightly twisting the clip 510D, so that hooked portions 526D, 528D were adjacent the flange (on the opposite side thereof to the leg 514D) and interacted with the upper edge of the lowermost aperture 536E.

Leg 516D was then pushed up, and the clip slightly twisted, until its foot 530D was aligned with the second lowermost aperture 536D, allowing foot 530D to be inserted thereinto. The hooked portions 532D, 534D were adjacent the flange (on the opposite side thereof to the leg 516D) and interacted with the lower edge of aperture 536D. This thereby attached the clip 510D to the Y-post and secured the barbed wire strand $S_{B1}$ thereto.

As the second barbed wire strand $S_{B2}$ was to be located with a 'regular' spacing between each adjacent barbed wire strand ($S_{B1}$ and $S_{B3}$), clip 510C was positioned at the flange of the post, near the lower two marked apertures 536C and 536D, with leg 514C located closer to aperture 536D, and leg 516C located closer to aperture 536C. The legs 514C, 516C of the clip 510C were slightly separated so that the recess 520C of clip 510C received the flange therebetween, and the strand retaining portion 518C received barbed wire strand $S_{B2}$ therein. The foot 524C of leg 514C was inserted through the aperture 536D, by slightly twisting the clip 510C, so that hooked portions 526C, 528C were adjacent the flange (on the opposite side thereof to the leg 514C) and interacted with the upper edge of the second lowermost aperture 536D.

Leg 516C was then pushed up, and the clip slightly twisted, until its foot 530C was aligned with the second lowermost aperture 536C, allowing foot 530C to be inserted thereinto. The hooked portions 532C, 534C were adjacent the flange (on the opposite side thereof to the leg 516C) and interacted with the lower edge of aperture 536C. This thereby attached the clip 510C to the Y-post and secured the barbed wire strand $S_{B2}$ thereto.

As the third barbed wire strand $S_{B3}$ was to be located with a 'regular' spacing between each the lower barbed wire strand ($S_{B2}$), clip 510B was positioned at the flange of the post, near the lower two marked apertures 536B and 536C, with leg 514B located closer to aperture 536C, and leg 516E located closer to aperture 536B. The legs 514B, 516B of the clip 510B were slightly separated so that the recess 520B of clip 510B received the flange therebetween, and the strand retaining portion 518B received barbed wire strand $S_{B3}$ therein. The foot 524B of leg 514B was inserted through the aperture 536C, by slightly twisting the clip 510B, so that hooked portions 526B, 528B were adjacent the flange (on the opposite side thereof to the leg 514B) and interacted with the upper edge of the middle aperture 536C.

Leg 516B was then pushed up, and the clip slightly twisted, until its foot 530B was aligned with the second uppermost aperture 536B, allowing foot 530B to be inserted thereinto. The hooked portions 532B, 534B were adjacent the flange (on the opposite side thereof to the leg 516B) and interacted with the lower edge of aperture 536B. This thereby attached the clip 510E to the Y-post and secured the barbed wire strand $S_{B3}$ thereto.

As the fourth (and uppermost) barbed wire strand $S_{B4}$ was to be located with a larger spacing between it and the adjacent strand ($S_{B3}$) clip 510A was positioned at the flange of the post, near the lower two marked apertures 536A and 536B, with leg 516A located closer to aperture 536B, and leg 514A located closer to aperture 536A (i.e. the orientation of clip 510A was inverted when compared to clips 510B, 510C and 510D). This allowed the strand retaining portion 518A of clip 510A to have a larger spacing between the third and fourth barbed wire strands ($S_{B3}$ and $S_{B4}$, respectively). The legs 514A, 516A of the clip 510A were slightly separated so that the recess 520A of clip 510A received the flange therebetween, and the strand retaining portion 518A received barbed wire strand $S_{B4}$ therein. The foot 530A of lower leg 516A was inserted through the aperture 536B, by slightly twisting the clip 510A, so that hooked portions 532A, 534A were adjacent the flange (on the opposite side thereof to the leg 516A) and interacted with the upper edge of aperture 536B.

Leg 514A was then pushed up, and the clip slightly twisted, until its foot 524A was aligned with the aperture 536A, allowing foot 524A to be inserted thereinto. The hooked portions 526A, 528A were adjacent the flange (on the opposite side thereof to the leg 514A) and interacted with the lower edge of aperture 536A. This thereby attached the clip 510A to the Y-post and secured the barbed wire strand $S_{B3}$ thereto. This provided a somewhat larger spacing between strands $S_{B2}$ and $S_{B3}$ (as strand $S_{B2}$ was located in closer proximity to aperture 536C than 536B, and strand $S_{B3}$ was located in closer proximity to aperture 536A than 536B).

In use, the larger strand retaining portions 518 were shown to provide a safer alternative to conventional wire ties, as when the barbed wire broke, the enlarged strand retaining portion 518 allowed the barbs to be safely pulled through the strand retaining portions 518. Additionally, where the ground over which the fence line was set was undulating, the increased size of the strand retaining portions 518 allowed the user to make localised adjustments by altering the locations of the barbs (e.g. by passing the barb through the strand retaining portion 518).

The apparatus, methods and systems as outlined in the Examples were observed to enable a user (e.g. a farmer) to simply and rapidly construct a fence line, or attach a reflector to a post, without the need for complex tools, although, in some instances, the use of a simple tool was preferred. The apparatus, methods and systems as outlined in the Examples were also easy and cost-effective to manufacture.

Whilst a number of specific apparatus, method and system embodiments have been described, it should be appreciated that the method and system may be embodied in many other forms.

For example, the strand to be attached to the post can include elongate components such as rod, bar, etc. The strand may also include, for example, a barbed wire. The post need not be limited to upright posts and pickets and can include rails, cross-members, struts, stays, channels, etc which in use extend other than vertically.

Whilst a usual application of the apparatus, method and system is in fencing, to secure wire strands to a fence post, the apparatus, methods and systems can be employed in applications such as demarcation, signage, retention, barricades etc.

Also, whilst the posts are usually roll-formed from steel to have a Y-shaped or T-shaped profile, and are usually cut at the end to take the form of a picket, the posts can optionally be moulded from a plastic material (e.g. for use in electric fencing).

Further, whilst reference is made to a strand retaining portion, in an alternative form the retaining portion may be adapted to retain items other than a strand. For example, the retaining portion may be adapted to retain an item inserted therein. Examples of such inserts may include an insulator (which may then be adapted to retain a strand), or a projection (which may then be adapted to display or hold signage, or a drooping or floppy projection, etc), or other item.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus, method and system as disclosed herein.

What is claimed is:

1. Apparatus for securing at least one strand with respect to an elongate flange of a post, the apparatus comprising an elongate element, the element forming a strand retaining portion and first and second projecting portions that extend from the strand retaining portion, wherein the strand retaining portion traverses a central plane, and wherein the first projecting portion extends in one plane on one side of said central plane and the second projecting portion extends in an other plane on an other side of said central plane, the one plane and the other plane being spaced from and parallel to said central plane, the first projecting portion having an inner side facing said central plane and the second projecting portion having an inner side facing said central plane, the inner side of the first projecting portion being spaced a distance from the inner side of the second projecting portion to thereby define, between the inner sides of the first and second projecting portions, a recess that is configured to receive the elongate flange,
    wherein an end of the first projecting portion remote from the strand retaining portion is configured to interact with the flange by extending through a first aperture in the elongate flange to said other side of said central plane, and an end of the second projecting portion remote from the strand retaining portion is also configured to interact with the flange by extending through a second aperture in the elongate flange to said one side of said central plane, so as to secure the apparatus to the post,
    wherein, when the apparatus is connected to the elongate flange and when the elongate flange has a thickness equal to said distance, the structure of the apparatus causes the elongate flange to be coincident with said central plane, and
    wherein the first projecting portion is shorter than the second projecting portion.

2. Apparatus as claimed in claim 1 wherein the first projecting portion end comprises a hook with two leg portions that are configured to extend through, and interact with an edge of, the first aperture through the elongate flange, and wherein the second projecting portion end comprises a hook with two leg portions that are configured to extend through, and interact with an edge of, the second aperture through the elongate flange so as to secure the apparatus to the post.

3. Apparatus as claimed in claim 2 wherein the two hook portions are bent so as to form a bulbous loop located at the end of each of the first and second projecting portions.

4. Apparatus as claimed in claim 1 wherein the first and second projecting portions are biased apart.

5. Apparatus as claimed in claim 1 wherein the ends of the projecting portions are further adapted to engage a side of the elongate flange opposite to the side on which the portion projects.

6. Apparatus as claimed in claim 1 wherein the strand retaining portion is adapted to space the strand from a distal edge of the elongate flange.

7. A system comprising a post and an apparatus for securing at least one strand to the post;
    the post being of the type that comprises an elongate flange having first and second apertures therethrough, and the elongate flange having a thickness; and
    the apparatus being connected to the flange and comprising an elongate element, the element forming a strand retaining portion and first and second projecting portions that extend from the strand retaining portion, wherein the strand retaining portion traverses a central plane, and wherein the first projecting portion extends in one plane on one side of said central plane and the second projecting portion extends in an other plane on an other side of said central plane, the one plane and the other plane being spaced from and parallel to said central plane, the first projecting portion having an inner side facing said central plane and the second projecting portion having an inner side facing said central plane, the inner side of the first projecting portion being spaced a distance equal to the thickness of the flange from the inner side of the second projecting portion to thereby define, between the inner sides of the first and second projecting portions, a recess receiving the elongate flange,
    wherein an end of the first projecting portion remote from the strand retaining portion interacts with the flange by extending through the first aperture in the elongate flange to said other side of said central plane, and an end of the second projecting portion remote from the strand retaining portion interacts with the flange by extending through the second aperture in the elongate flange to said one side of said central plane, so as to secure the apparatus to the post,
    wherein the structure of the apparatus causes the elongate flange to be coincident with said central plane, and
    wherein the first projecting portion is shorter than the second projecting portion.

8. A system as claimed in claim 7 wherein the first aperture is adjacent to the second aperture.

9. A system as claimed in claim 7 wherein the post comprises a third aperture through the elongate flange and the system comprises a second one of said apparatus, a projecting portion of the first-mentioned apparatus extends through a given one of the first, second and third apertures, and a projecting portion of the second one of said apparatus extends through said given one of the first, second and third apertures.

10. A system as claimed in claim 9, wherein the first projecting portion of the first-mentioned apparatus and the first projecting portion of the second one of said apparatus are positioned on opposite sides of the flange, to alter the spacing between adjacent strand retaining portions.

11. A system as claimed in claim 9, wherein the first projecting portion of the first-mentioned apparatus and the first projecting portion of the second one of said apparatus are positioned on the same side of the flange, to maintain a constant spacing between adjacent strand retaining portions.

12. Apparatus for securing at least one strand with respect to an elongate flange of a post, the apparatus comprising an elongate element, the element forming a strand retaining portion and first and second projecting portions that extend from the strand retaining portion, wherein the strand retaining portion traverses a central plane, and wherein the first projecting portion extends in one plane on one side of said central plane, and the second projecting portion extends in an other plane on an other side of said central plane, the one plane and the other plane being spaced from and parallel to said central plane, the first projecting portion having an inner side facing said central plane and the second projecting portion having an inner side facing said central plane, the inner side of the first projecting portion being spaced a distance from the inner side of the second projecting portion to thereby define, between the inner sides of the first and second projecting portions, a recess that is configured to receive the elongate flange, the first and second projecting portions each having an end that is remote from the strand retaining portion, that extends inward toward said central plane, and that is configured to interact with the elongate flange to secure the apparatus to the post, and wherein, when the apparatus is connected to the elongate flange and when the elongate flange has a thickness equal to said distance, the structure of the apparatus causes the elongate flange to be coincident with said central plane.

13. Apparatus as claimed in claim 12, wherein the strand retaining portion further comprises at least one coil, wherein the at least one coil traverses said plane between the first projecting portion and the second projecting portion.

14. Apparatus as claimed in claim 12, wherein the strand retaining portion is in the form of a single revolution of a spiral that revolves around an axis perpendicular to the plane traversed by the strand retaining portion, and wherein the first and second projecting portions extend from opposite ends of the single revolution.

15. Apparatus as claimed in claim 14, wherein the end of the first projecting portion extends in one direction transverse to and toward said plane traversed by the strand retaining portion so that the end of the first projecting portion is able to extend from one side of the elongate flange through, and to interact with an edge of, a first aperture in the elongate flange, and wherein an end of the second projecting portion extends in a direction generally opposite to the one direction, transverse to and toward said plane traversed by the strand retaining portion so that the end of the second projecting portion is able to extend from an other side of the elongate flange through, and to interact with an edge of, a second aperture in the elongate flange so as to secure the apparatus to the post.

16. Apparatus as claimed in claim 12 wherein the first projecting portion end comprises a hook with two leg portions that are configured to extend through, and interact with an edge of, a first aperture through the elongate flange, and wherein the second projecting portion end comprises a hook with two leg portions that are configured to extend through, and interact with an edge of, a second aperture through the elongate flange so as to secure the apparatus to the post.

17. Apparatus as claimed in claim 16 wherein the two hook portions are bent so as to form a bulbous loop located at the end of each of the first and second projecting portions.

\* \* \* \* \*